United States Patent
Min et al.

(10) Patent No.: US 9,448,616 B2
(45) Date of Patent: Sep. 20, 2016

(54) ANTI-LEAKAGE SUPPLY CIRCUIT

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Jie Min, Wuhan (CN); Chun-Sheng Chen, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 144 days.

(21) Appl. No.: 14/525,550

(22) Filed: Oct. 28, 2014

(65) Prior Publication Data

US 2015/0261286 A1 Sep. 17, 2015

(30) Foreign Application Priority Data

Mar. 13, 2014 (CN) .......................... 2014 1 0091957

(51) Int. Cl.
*G06F 1/00* (2006.01)
*G06F 1/26* (2006.01)
*G06F 1/32* (2006.01)

(52) U.S. Cl.
CPC ........... *G06F 1/3287* (2013.01); *G06F 1/3206* (2013.01); *G06F 1/26* (2013.01)

(58) Field of Classification Search
CPC .................................... G06F 1/32; G06F 1/26
See application file for complete search history.

(56) References Cited

U.S. PATENT DOCUMENTS

| | | | | |
|---|---|---|---|---|
| 8,242,628 B2* | 8/2012 | Ger | ..................... | H02M 1/4225 307/17 |
| 2009/0089601 A1* | 4/2009 | Nonaka | ................... | H04L 12/10 713/323 |
| 2009/0230781 A1* | 9/2009 | Hung | ..................... | G06F 1/3203 307/140 |
| 2010/0115296 A1* | 5/2010 | Inoue | ..................... | G06F 1/266 713/300 |
| 2010/0220506 A1* | 9/2010 | Tai | ......................... | H02M 1/36 363/49 |
| 2011/0148923 A1* | 6/2011 | Sadowski | ............ | G06F 1/3225 345/634 |
| 2011/0264942 A1* | 10/2011 | Tsukamoto | ............ | G06F 1/266 713/324 |
| 2012/0272074 A1* | 10/2012 | Zeung | ................... | G06F 13/385 713/300 |
| 2013/0042129 A1* | 2/2013 | Park | ..................... | G06F 1/3275 713/323 |
| 2013/0067259 A1* | 3/2013 | Freiwald | ............... | G06F 1/3293 713/323 |
| 2013/0308152 A1* | 11/2013 | Jeong | ................. | G03G 15/5004 358/1.14 |
| 2014/0153025 A1* | 6/2014 | Min | ..................... | G06F 1/3206 358/1.14 |

* cited by examiner

*Primary Examiner* — Phil Nguyen
(74) *Attorney, Agent, or Firm* — Zhigang Ma

(57) ABSTRACT

An anti-leakage supply circuit which avoids any power leakage to earth includes an interface, a management chip configured to detect a working state of a computer, a motherboard power supply configured to supply power to the interface and the management chip, and a control circuit coupled to the management chip. The control circuit is coupled between the motherboard power supply and the interface. The management chip is configured to output a signal to the control circuit when the computer is in standby state which disconnects the motherboard power supply and the interface.

16 Claims, 2 Drawing Sheets

ANTI-LEAKAGE SUPPLY CIRCUIT

CROSS-REFERENCE TO RELATED APPLICATIONS

This application claims priority to Chinese Patent Application No. 201410091957.1 Mar. 13, 2014, the contents of which are incorporated by reference herein.

FIELD

The subject matter herein generally relates to power conservation.

BACKGROUND

An anti-leakage supply circuit may be used to prevent a computer from leakage to earth.

BRIEF DESCRIPTION OF THE DRAWINGS

Implementations of the present technology will now be described, by way of example only, with reference to the attached figures.

DETAILED DESCRIPTION

Figure 1:
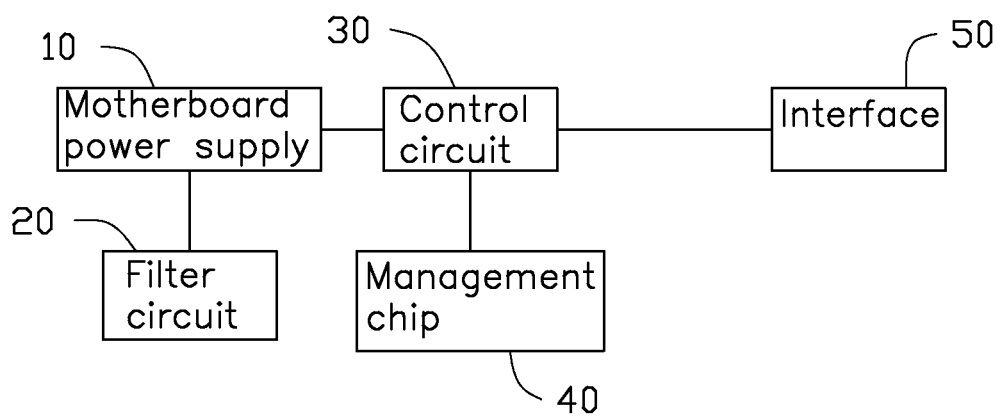
FIG. 1 is a block diagram of one embodiment of an anti-leakage supply circuit and an interface.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

The present disclosure is described in relation to an anti-leakage supply circuit configured to prevent a computer from current leakage to earth when the computer is in standby mode.

FIG. 1 illustrates an embodiment of an anti-leakage supply circuit. The anti-leakage supply circuit comprises a motherboard power supply 10, a filter circuit 20 coupled to the motherboard power supply 10, a control circuit 30 coupled to the motherboard power supply 10, and a management chip 40. The control circuit 30 is configured to couple to an interface 50. The motherboard power supply 10 is configured to supply the management chip 40. In one embodiment, the interface 50 is a VGA interface; the management chip 40 is a south bridge chip, and the management chip 40 is configured to output different signals according to working state of a computer. The working states of a computer comprise a normal state (S0 state) and more than one standby states. The standby states comprise an S3 state (Suspend to RAM), an S4 state (Suspend to Disk), and an S5 state (Turn off).

Figure 2:
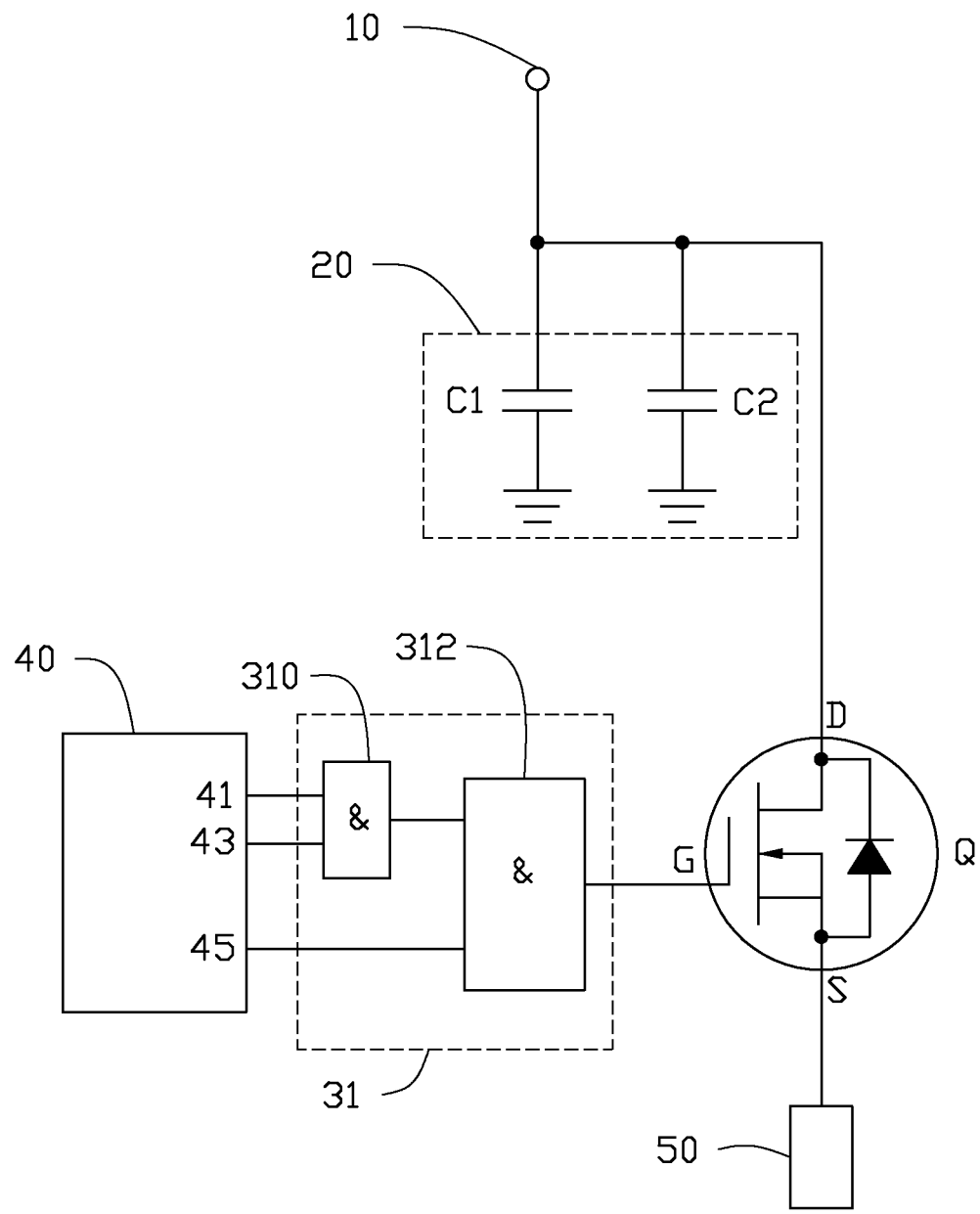
FIG. 2 is a circuit diagram of the anti-leakage supply circuit and the interface of FIG. 1.

FIG. 2 illustrates that the filter circuit 20 comprises a first capacitor C1 and a second capacitor C2.

The control circuit 30 comprises a logical circuit 31 and a field effect transistor (FET) Q. The logical circuit 31 comprises a first AND-circuit 310 and a second AND-circuit 312. In one embodiment, the FET Q is an N-channel FET.

The motherboard power supply 10 is grounded via the first capacitor C1 and also grounded via the second capacitor C2. A first terminal 41 of the management chip 40 is coupled to a first input end (not labeled) of the first AND-circuit 310 and a second terminal 43 of the management chip 40 is coupled to a second input end (not labeled) of the first AND-circuit 310. A third terminal 45 of the management chip 40 is coupled to a first input end (not labeled) of the second AND-circuit 312. An output end (not labeled) of the first AND-circuit 310 is coupled to a second input end (not labeled) of the second AND-circuit 312. An output end (not labeled) of the second AND-circuit 312 is coupled to a gate terminal G of the FET Q. A drain terminal D of the FET Q is coupled to the motherboard power supply 10. A source terminal S of the FET Q is coupled to the interface 50.

Table 1 illustrates that the first terminal 41 of the management chip 40 is configured to output a first signal. The second terminal 43 of the management chip 40 is configured to output a second signal. The third terminal 45 of the management chip 40 is configured to output a third signal. The second AND-circuit 312 is configured to output a fourth signal. Each of the first, second, third, and fourth signal is a logical-high signal, when the computer is in S0 state. Each of the first and fourth signal is a logical-low signal, each of the second and third signal is a logical-high signal, when the computer is in S3 state. Each the first, second, and fourth signal is a logical-low signal and the third signal is a logical-high signal, when the computer is in S4 state. Each the first, second, third, and fourth signal is a logical-low signal, when the computer is in S5 state.

TABLE 1

|  | S0 | S3 | S4 | S5 |
|---|---|---|---|---|
| first signal | 1 | 0 | 0 | 0 |
| second signal | 1 | 1 | 0 | 0 |
| third signal | 1 | 1 | 1 | 0 |
| fourth signal | 1 | 0 | 0 | 0 |

The working principle of the interface supply circuit is that the motherboard power supply 10 supplies the management chip 40 via the filter circuit 20 when the computer is in S0 state. The first terminal 41 of the management chip 40 outputs a logical-low first signal to the first AND-circuit 310 when the management chip 40 detects that the computer is in S3 state. The first AND-circuit 310 outputs a logical-low second signal to the second AND-circuit 312 after receiving the logical-low first signal from the management chip 40. The second AND-circuit 312 outputs a logical-low first disconnecting signal to the FET Q after receiving the logical-low second signal from the first AND-circuit 310. The FET Q is switched off after receiving the first logical-low disconnecting signal from the second AND-circuit 312, thus the motherboard power supply 10 is disconnected from the interface 50. Each of the first terminal 41 and the second terminal 43 of the management chip 40 outputs a logical-low third signal to the first AND-circuit 310 when the management chip 40 detects that the computer is in S4 state. The first AND-circuit 310 outputs a logical-low fourth signal to the second AND-circuit 312 after receiving the logical-low third signal from the management chip 40. The second AND-circuit 312 outputs a logical-low second disconnecting signal to the FET Q after receiving the logical-low fourth signal from the first AND-circuit 310. The FET Q is switched off after receiving the logical-low second disconnecting signal from the second AND-circuit 312, thus the motherboard power supply 10 is disconnected from the interface 50. Each of the first terminal 41, the second terminal 43, and the third terminal 45 of the management chip 40 outputs a logical-low fifth signal, when the management chip 40 detects that the computer is in S5 state. The second AND-circuit 312 outputs a logical-low third disconnecting signal to the FET Q after receiving the logical-low fifth signal from the third terminal 45 of the management chip 40. The FET Q is switched off by the logical-low third disconnecting signal from the second AND-circuit 312, thus the motherboard power supply 10 is disconnected from the interface 50. Any leakage to earth after the motherboard power supply 10 is disconnected from the interface 50.

In the interface supply circuit, the control circuit 30 outputs the logical-low disconnecting signal to disconnect the FET Q, thus the motherboard power supply 10 is disconnected from the interface 50 thereby avoiding any leakage to earth.

It is to be understood that even though numerous characteristics and advantages have been set forth in the foregoing description of embodiments, together with details of the structures and functions of the embodiments, the disclosure is illustrative only and changes may be made in detail, including in the matters of shape, size, and arrangement of parts within the principles of the disclosure to the full extent indicated by the broad general meaning of the terms in which the appended claims are expressed.

What is claimed is:

1. An anti-leakage supply circuit comprising:
an interface;
a management chip configured to detect a working state of a computer;
a motherboard power supply configured to supply power to the interface and the management chip; and
a control circuit coupled between the motherboard power supply and the interface,
wherein the management chip is configured to output a first signal to the control circuit; and
the control circuit is configured to disconnect the motherboard power supply and the interface upon receiving the first signal when the computer is in a standby state wherein the control circuit comprises a logical circuit coupled to the management chip and a FET coupled to the logical circuit, the logical circuit outputs a disconnecting signal to the FET after receiving the first signal, and the FET disconnects after receiving the disconnecting signal, thus the motherboard power supply is disconnected from the interface;
wherein the logical circuit comprises a first AND-circuit and a second AND-circuit, the management chip comprises a first terminal configured to output the first signal, a second terminal configured to output a second signal, and a third terminal configured to output a third signal, the management chip is coupled to input ends of the first AND-circuit and outputs the first signal and a second signal to the first AND-circuit, the management chip is coupled to a first input end of the second AND-circuit and outputs a third signal to the second AND-circuit, an output end of the first AND-circuit is coupled to a second input end of the second AND-circuit, an output end of the second AND-circuit is coupled to the FET, the first AND-circuit outputs a fourth signal to the second AND-circuit after receiving the first signal, the second AND-circuit outputs the disconnecting signal to the FET after receiving the third signal and the fourth signal.

2. The anti-leakage supply circuit of claim 1, wherein the management chip comprises a first terminal configured to output the first signal, a second terminal configured to output the second signal, and a third terminal configured to output the third signal, the first terminal of the management chip is coupled to a first input end of the first AND-circuit, the second terminal of the management chip is coupled to a second input end of the first AND-circuit, the third terminal of the management chip is coupled to a first input end of the second AND-circuit.

3. The anti-leakage supply circuit of claim 1, wherein the standby state comprises a S3 (Suspend to RAM) state, the first signal is a logical-low signal, each of the second signal and third signal is a logical-high signal.

4. The anti-leakage supply circuit of claim 1, wherein the fourth signal is a logical-low signal.

5. The anti-leakage supply circuit of claim 1, wherein the standby state is a S5 (Turn off) state, each of the first, second, and third signal is a logical-low signal.

6. The anti-leakage supply circuit of claim 1, wherein the standby state is a S4 (Suspend to Disk) state, each of the first signal and second signal is a logical-low signal, the third signal is a logical-high signal.

7. The anti-leakage supply circuit of claim 1, wherein the FET is an N-channel FET.

8. The anti-leakage supply circuit of claim 7, wherein a gate terminal of the FET is coupled to the logical circuit, a drain terminal of the FET is coupled to the motherboard power supply, a source terminal of the FET is coupled to the interface.

9. An anti-leakage supply circuit comprising:
an interface;
a management chip configured to detect a working state of a computer;
a motherboard power supply configured to supply power to the interface and the management chip; and
a control circuit coupled to the management chip,
wherein the control circuit is coupled between the motherboard power supply and the interface, the management chip outputs a first signal to the control circuit when the computer is in a standby state, the control circuit disconnects the motherboard power supply and the interface upon receiving the first signal wherein the control circuit comprises a logical circuit coupled to the management chip and a FET coupled to the logical circuit, the logical circuit outputs a disconnecting signal to the FET after receiving the first signal, and the FET disconnects after receiving the disconnecting signal, thus the motherboard power supply is disconnected from the interface;
wherein the logical circuit comprises a first AND-circuit and a second AND-circuit, the management chip comprises a first terminal configured to output the first signal, a second terminal configured to output a second signal, and a third terminal configured to output a third signal, the first terminal of the management chip is coupled to a first input end of the first AND-circuit, the second terminal of the management chip is coupled to a second input end of the first AND-circuit, the third terminal of the management chip is coupled to a first input end of the second AND-circuit, an output end of the first AND-circuit is coupled to a second input end of the second AND-circuit, an output end of the second AND-circuit is coupled to the FET, the first AND-circuit outputs a fourth signal to the second AND-circuit after receiving the first signal, the second AND-circuit outputs the disconnecting signal to the FET after receiving the third signal and the fourth signal.

10. The anti-leakage supply circuit of claim 9, wherein the standby state comprises an S3 (Suspend to RAM) state, the first signal is a logical-low signal, each of the second signal and the third signal is a logical-high signal.

11. The anti-leakage supply circuit of claim 9, wherein the fourth signal is a logical-low signal.

12. The anti-leakage supply circuit of claim 9, wherein the standby state is an S5 (Turn off) state, each of the first, second, and third signal is a logical-low signal.

13. The anti-leakage supply circuit of claim 9, wherein the standby state is a S4 (Suspend to Disk) state, each of the first signal and the second signal is a logical-low signal, the third signal is a logical-high signal.

14. The anti-leakage supply circuit of claim 9, wherein the FET is an N-channel FET.

15. The anti-leakage supply circuit of claim 14, wherein a gate terminal of the FET is coupled to the logical circuit, a drain terminal of the FET is coupled to the motherboard power supply, a source terminal of the FET is coupled to the interface.

16. The anti-leakage supply circuit of claim 9, wherein the interface is a VGA interface.

* * * * *